United States Patent [19]

Parry

[11] Patent Number: 5,710,941
[45] Date of Patent: Jan. 20, 1998

[54] SYSTEM FOR SUBSTITUTING PROTECTED MODE HARD DISK DRIVER FOR REAL MODE DRIVER BY TRAPPING TEST TRANSFERS TO VERIFY MATCHING GEOMETRIC TRANSLATION

[75] Inventor: William George Parry, Bellevue, Wash.

[73] Assignee: Microsoft Corporation, Redmond, Wash.

[21] Appl. No.: 396,522

[22] Filed: Feb. 28, 1995

[51] Int. Cl.[6] .................................................. G06F 9/445
[52] U.S. Cl. ........................... 395/834; 395/500; 395/681; 364/254.8
[58] Field of Search ...................... 395/600, 325, 395/200, 700, 400, 375, 725, 500, 681, 834; 375/222, 9; 364/900, 254.8; 179/2

[56] References Cited

U.S. PATENT DOCUMENTS

| | | | |
|---|---|---|---|
| 4,215,243 | 7/1980 | Maxwell | 179/2 |
| 4,358,825 | 11/1982 | Kyu et al. | 364/200 |
| 4,386,416 | 5/1983 | Giltner et al. | 364/900 |
| 4,737,967 | 4/1988 | Cahalan | 375/9 |
| 4,779,187 | 10/1988 | Letwin | 395/570 |
| 5,023,869 | 6/1991 | Grover et al. | 370/84 |
| 5,193,161 | 3/1993 | Bealkowski et al. | 395/400 |
| 5,255,379 | 10/1993 | Melo | 395/400 |
| 5,264,958 | 11/1993 | Johnson | 395/325 |
| 5,276,888 | 1/1994 | Kardach et al. | 395/725 |
| 5,303,378 | 4/1994 | Cohen | 395/737 |
| 5,307,491 | 4/1994 | Feriozi et al. | 395/700 |
| 5,315,706 | 5/1994 | Thomson et al. | 395/200 |
| 5,355,490 | 10/1994 | Kou | 395/653 |
| 5,390,301 | 2/1995 | Scherf | 395/325 |
| 5,442,783 | 8/1995 | Oswald et al. | 395/600 |
| 5,459,867 | 10/1995 | Adams et al. | 395/700 |
| 5,459,869 | 10/1995 | Spilo | 395/700 |
| 5,481,684 | 1/1996 | Richter et al. | 395/375 |
| 5,491,720 | 2/1996 | Davis et al. | 375/222 |
| 5,537,597 | 7/1996 | Sandage | 395/700 |
| 5,561,788 | 10/1996 | Letwin | 395/500 |
| 5,604,887 | 2/1997 | Naidu et al. | 395/500 |

OTHER PUBLICATIONS

AT Attachment Interface, Rev. 3.3. pp. 1–58, Dec. 11, 1992.
The PC Undocumented, A Programmer's Guide to I/O, CPUs, and Fixed Memory Areas, Frank Van Gilluwe, The Andrew Schulman Programming Series, pp. 466–562.
Livingston, Brian, 32-Bit File Access stirs up trouble with some DOS applications, InfoWorl, p. 25, Jul. 4, 1994.

*Primary Examiner*—Thomas C. Lee
*Assistant Examiner*—Ki S. Kim
*Attorney, Agent, or Firm*—Klarquist Sparkman Campbell Leigh & Whinston LLP

[57] ABSTRACT

A protected mode operating system utilizes a protected mode hard disk driver which bypasses an existing real mode hard disk driver on computer systems in which the real mode hard disk driver performs geometry translation of hard disk addresses. The protected mode hard disk driver determines a geometry translation based on geometry data retrieved from the computer systems' hard disk, then verifies whether the geometry translation is utilized by the existing real mode hard disk driver by trapping accesses to hard disk input/output ports, and issuing read requests to the existing real mode hard disk driver at plural hard disk addresses.

17 Claims, 5 Drawing Sheets

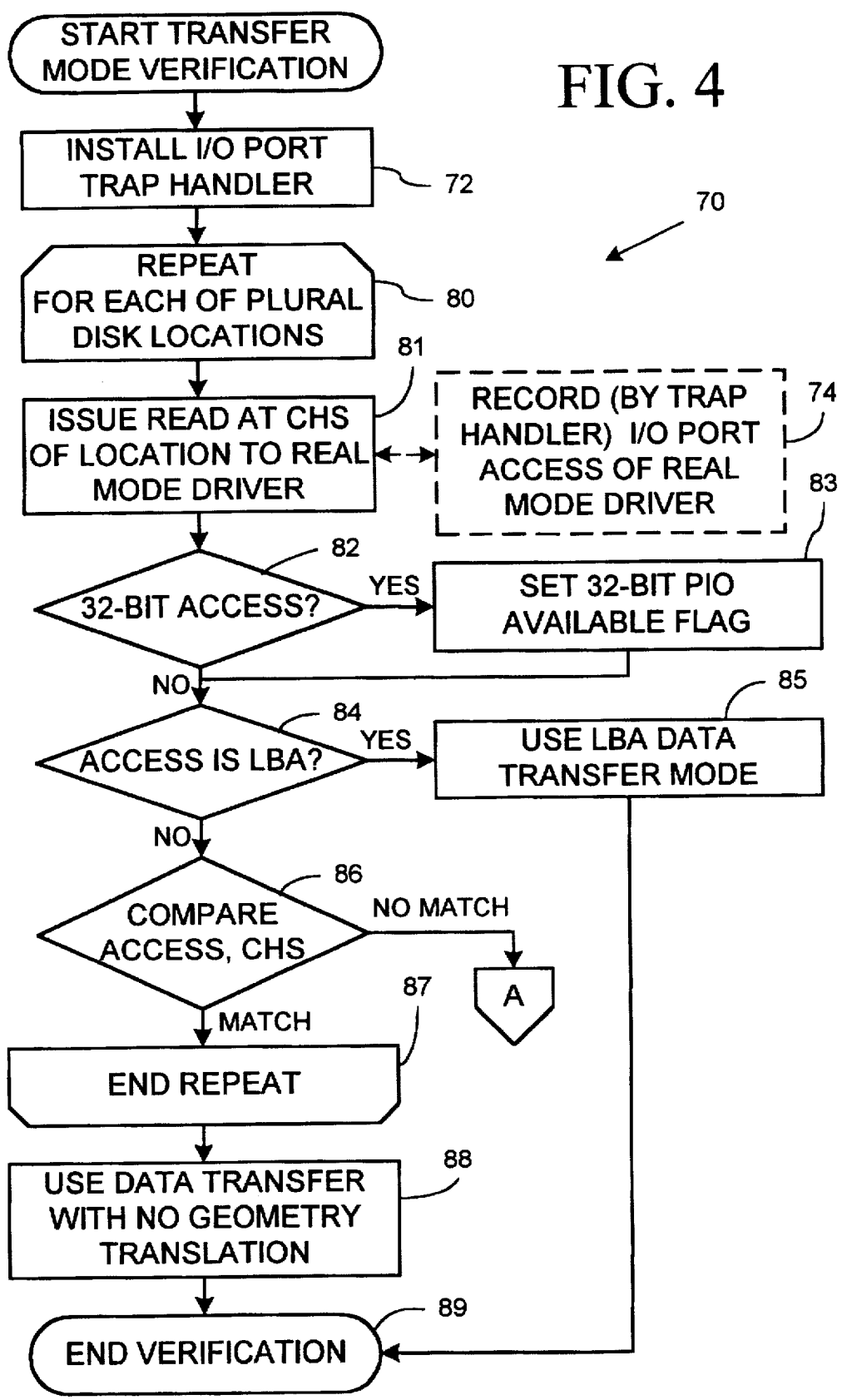

5,710,941

SYSTEM FOR SUBSTITUTING PROTECTED MODE HARD DISK DRIVER FOR REAL MODE DRIVER BY TRAPPING TEST TRANSFERS TO VERIFY MATCHING GEOMETRIC TRANSLATION

FIELD OF THE INVENTION

This invention relates generally to device drivers which channel data input and output for various hardware devices, and more particularly relates to a hard disk driver which verifies a hard disk drive's available transfer modes.

BACKGROUND OF THE INVENTION

Computer systems generally employ various hardware devices, including devices for data storage and retrieval. A typical personal computer, for example, includes a hard disk drive on which data used by various programs is stored in the form of files. An operating system program for these computer systems generally controls the system's hardware devices, and provides services through which application programs can interact with the devices. The operating system may, for example, provide a file system and associated services by which application programs access (i.e. store and retrieve) data as files on a hard disk drive.

The operating system itself typically interacts with a particular hardware device through a module of code referred to as a device driver, which includes all code specific to the particular hardware device. Generalized operating system services, such as the file system, access hardware devices through their corresponding drivers (e.g. a hard disk drive through a hard disk driver). The code of the operating system can thus be made device independent, yet interoperable with computers of various hardware configurations by installing appropriate device drivers. These drivers may be provided with the operating system, or separately by the hardware device manufacturer or computer system manufacturer.

Many of the personal computers commonly known as IBM compatibles employ the 80×86 microprocessors available from Intel Corporation and the DOS and Windows operating systems available from Microsoft Corporation. The earlier versions of the Intel microprocessors, i.e. the 8086 and 80286 microprocessors, provide a mode of operation characterized by its lack of a protection mechanism, which is commonly referred to as "real mode." More recent versions of these Intel microprocessors, i.e. the 80386, 80486, and Pentium microprocessors (hereafter the "Intel protected mode microprocessors"), additionally provide a "protected mode" of operation. In the protected mode, programs can be allocated by the operating system to execute at any of a plurality of privilege levels (commonly referred to as "rings"), where their access to data and code of other rings is restricted by the microprocessor performing privilege checks. The microprocessor's privilege checking prevents programs from accessing data allocated at more privileged rings, and from executing code allocated at less privileged rings. This protection mechanism allows critical portions of the operating system to be isolated at a most privileged ring. Less reliable programs applications) are allocated at less privileged rings and prevented by the microprocessor's privilege checking from haphazardly modifying critical operating system data structures. These protection features are particularly useful for multi-tasking operating systems.

IBM compatible personal computers include a program known as the Basic Input/Output System or BIOS which is stored in its ROM memory. The BIOS comprises a number of program modules, including, among others, a hard disk driver (hereafter the "BIOS hard disk driver") which operates in the real mode of the Intel 80×86 microprocessors. Another module of the BIOS is responsible for system initialization and utilizes the BIOS hard disk driver to load the operating system into the computer's RAM memory from the hard disk. Operating systems which operate in the real mode, such as Microsoft's DOS operating system, also generally utilize the BIOS hard disk driver for interacting with the computer's hard disk drives as illustrated in FIG. 1.

Operating systems which operate in the protected mode, however, can gain significant performance advantages from utilizing a protected mode driver to interact with the computer's hard disk drives, rather than the BIOS or other real mode hard disk driver. So that real mode device drivers and other programs designed for real mode execution can be executed by an operating system which itself operates in the protected mode, the Intel microprocessors provide a further mode of operation, referred to as "virtual 86 mode," with which real mode execution of programs can be emulated. When executing a real mode device driver in virtual 86 mode, the operating system is required to switch between the protected mode and virtual 86 mode of operation each time the driver is used. Each such switch between these modes causes a small delay, which altogether significantly degrades the performance of the operating system. Accordingly, a protected mode hard disk driver which does not require switching between protected and virtual 86 modes can gain a significant performance advantage over its real mode counterpart.

Further, in many personal computers, the BIOS or other real mode hard disk driver utilizes 16-bit code. A protected mode operating system which itself uses 32-bit code can gain a significant performance advantage through use of a protected mode hard disk driver which also utilizes 32-bit code.

Additionally, a protected mode hard disk driver may gain further performance advantages over the BIOS or other real mode hard disk driver by providing services which are directly callable by operating system code. By contrast, an operating system interfaces with the BIOS hard disk driver by executing software interrupts. The majority of the services provided by the BIOS hard disk driver are accessed by storing a function number in an AH register of the Intel 80×86 microprocessors, and invoking a 13h software interrupt. This interrupt interface (the "INT 13h interface") of the BIOS hard disk driver may make its services somewhat slower to access than a directly callable function provided in a protected mode hard disk driver.

For the above reasons, a protected mode operating system can gain significant performance increases by substituting a protected mode driver through which it channels its interactions with a hardware device, in place of the BIOS or other real mode driver. Microsoft Corporation's Windows version 3.1 operating system (hereafter "Windows 3.1"), for example, provides a protected mode hard disk driver for IDE type hard disk drives (hereafter "Windows 3.1 IDE hard disk driver") which can be substituted for the BIOS hard disk driver of some computers on which the operating system is installed. When substituted for the BIOS hard disk driver, the Windows 3.1 IDE hard disk driver substantially improves the performance of Windows 3.1's hard disk drive operations. The Windows 3.1 IDE hard disk driver, however, has a drawback that it cannot be utilized in a substantial proportion of IBM compatible personal computers. A problem arises in that the BIOS or other real mode hard disk driver may interact with the hard disk drive in non-standard ways which prevents the Windows 3.1 IDE hard disk driver from correctly functioning. Windows 3.1 therefore is unable to substitute this driver for the BIOS or other real mode driver on a substantial percentage of the computers on which Windows 3.1 is installed.

For example, the BIOS or other real mode driver for larger hard disk drives may utilize a translation scheme which maps an apparent disk geometry used by the operating system to address locations on the hard disk to the hard disk's actual physical geometry. Such translation is commonly used when the actual geometries of a hard disk drive exceed the size of the parameters used by the operating system to designate locations on a hard disk in its interface to the real mode hard disk driver. In particular, the INT 13h interface of the BIOS hard disk driver has a maximum parameter size of 10 bits in which to specify a cylinder of a hard disk for read and write operations. Accordingly, the operating system is prevented from specifying addresses for any more than 1024 cylinders using this interface. For hard disks having greater than 1024 cylinders, the BIOS hard disk driver avoids this limitation by converting the addresses specified by the INT 13h interface parameters from an apparent geometry having 1024 or fewer cylinders to the hard disk's actual geometry. An estimated 35% of IBM compatible personal computers have real mode drivers which utilize geometry translation. As the size of hard disk drives continues to increase and more computers with larger hard disk drives are sold, this figure is expected to increase.

If a substitute protected mode hard disk driver (e.g. the Windows 3.1 IDE hard disk driver) fails to use the real mode hard disk driver's translation scheme, data that the real mode hard disk driver previously stored on the computer's hard disk drive will probably become corrupted when the protected mode hard disk driver thereafter stores data on that drive. Conversely, a protected mode hard disk driver with geometry translation can cause data corruption on computers whose real mode hard disk driver does not utilize geometry translation. To avoid such data corruption, the Windows 3.1 IDE hard disk driver performs a verification process when loading to ensure that the BIOS does not use geometry translation. In the verification process, the Windows 3.1 IDE hard disk driver issues a number of INT 13h interface requests for the BIOS hard disk driver to read data at various addresses on the hard disk, and reads the addresses written into controller registers of the hard disk drive by the BIOS hard disk driver in response to the INT 13h interface requests. The Windows 3.1 IDE hard disk driver then compares the addresses of the INT 13h interface requests to those written to the controller registers. If any of the addresses do not match, the Windows 3.1 IDE hard disk driver concludes that geometry translation is being used by the BIOS hard disk driver, and unloads itself. Accordingly, because geometry translation is used by the BIOS hard disk driver in an estimated 35% and increasing share of personal computers, the Windows 3.1 IDE hard disk driver will not be substituted for the BIOS hard disk driver on a substantial proportion of existing computers and an even larger number of new computers.

Some hard disk drives additionally provide performance enhancing transfer modes which would ideally be used by a hard disk driver if available. For example, on hard disk drives conforming to the ATA (Advanced Technology Attachment) standard, performance enhancing data transfer modes known as logical block addressing ("LBA") and 32-bit programmed input/output ("32-bit PIO") may be available. These transfer modes provide significant performance increases over the normal data transfer mode of the hard disk drives. The ATA standard requires that these hard disk drives provide identification information in response to an identify command. The identification information includes flags for the hard disk drive to indicate whether it supports the LBA and/or 32-bit PIO modes. However, some drives set these flags to indicate these data transfer modes are supported without correctly implementing the modes. Operating systems and drivers therefore cannot reliably determine whether the LBA or 32-bit PIO modes are available on computers in which they are installed from this identification information. Accordingly, previous protected mode hard disk drivers which substitute for the BIOS hard disk driver, such as the Windows 3.1 IDE hard disk driver, have not used these transfer modes.

An object of the invention therefore is to provide a protected mode hard disk driver capable of substituting for the real mode hard disk drivers of computers having various different hardware configurations, whether or not geometry translation is used by the real mode hard disk driver.

A further object of the invention is to substitute a protected mode hard disk driver that is capable of a data transfer mode with geometry translation for the BIOS hard disk driver in a protected mode operating system.

An additional object of the invention is to substitute a protected mode hard disk driver that is capable of a performance enhancing data transfer mode for the BIOS hard disk driver in a protected mode operating system.

SUMMARY OF THE INVENTION

The present invention provides a protected mode hard disk driver and method, for use with a computer and operating system, which verifies its data transfer mode (e.g. geometry translation, LBA, and 32-bit PIO transfer modes) against that of an existing real mode hard disk driver. By verifying that a data transfer mode also is used by the computer's existing real mode hard disk driver before modifying data on the hard disk drive using the data transfer mode, the protected mode hard disk driver can avoid corrupting data on the hard disk drive. The protected mode hard disk driver also is compatible for use with many more computers having various hardware configurations. Through verification against the transfer modes used by the real mode hard disk driver, the protected mode hard disk driver also can accurately determine that performance enhancing data transfer modes are available. The protected mode hard disk driver is then able to gain the performance benefits of these data transfer modes when available, and avoid incompatibility with computers whose hard disk drives do not adequately support such modes (despite a contrary indication in their identification information flags).

In a preferred embodiment, the protected mode hard disk driver verifies whether geometry translation is used by the existing real mode hard disk driver. This verification is made by issuing a number of requests for the computer's existing real mode hard disk driver to read data from the hard disk drive, and trapping any input/output port accesses by the existing real mode hard disk driver. A set of address data (hereafter "trapped address data set") specified in the trapped input/output port accesses is then compared to a set of address data that would be generated for the requested read data transfers without geometry translation. If the address data sets match, the existing real mode hard disk driver does not utilize geometry translation. This same data transfer mode (i.e. no geometry translation) is then used by the protected mode hard disk driver. Since the real mode hard disk driver also uses no geometry translation, any data transfers by the protected mode hard disk driver do not cause data corruption on these computers.

If the trapped address data set does not match the address data set for data transfers without geometry translation, the protected mode hard disk driver also verifies whether the existing real mode hard disk driver utilizes an assumed geometry translation based on geometry data obtained from the hard disk drive with an identify command. This verification is made by calculating a set of address data (hereafter "calculated address data set") that would be generated for the requested read data transfers utilizing the assumed geometry translation, then comparing the trapped address data set to the calculated address data set. If these sets match, the real mode hard disk driver utilizes the assumed geometry translation based on the identify command's geometry data. This same data transfer mode is then used by the protected mode hard disk driver. If these sets do not match, the protected mode hard disk driver unloads and data transfers continue to be channeled through the real mode hard disk driver. The protected mode hard disk driver therefore also is compatible for use with many of the additional share of computers whose existing real mode hard disk drivers utilize geometry translation.

In the preferred embodiment, the protected mode hard disk driver further verifies whether performance enhancing data transfer modes, such as the LBA or 32-bit PIO data transfer modes of ATA hard disk drives, are utilized by the computer's existing real mode hard disk driver. This verification again is performed by examining data specified in the trapped input/output port accesses of the real mode hard disk driver. If the real mode hard disk driver is determined to use a performance enhancing data transfer mode, the protected mode hard disk driver also performs data transfers utilizing that mode. The protected mode hard disk driver therefore achieves the significant performance advantages attainable through use of these data transfer modes.

Additional features and advantages of the invention will be made apparent from the following detailed description of a preferred embodiment which proceeds with reference to the accompanying drawings.

BRIEF DESCRIPTION OF THE DRAWINGS

FIGS. 4 and 4A are a flow chart of a method implemented in the protected mode hard disk driver of FIG. 3 for data transfer mode verification.

DETAILED DESCRIPTION OF THE PREFERRED EMBODIMENTS

Figure 1:
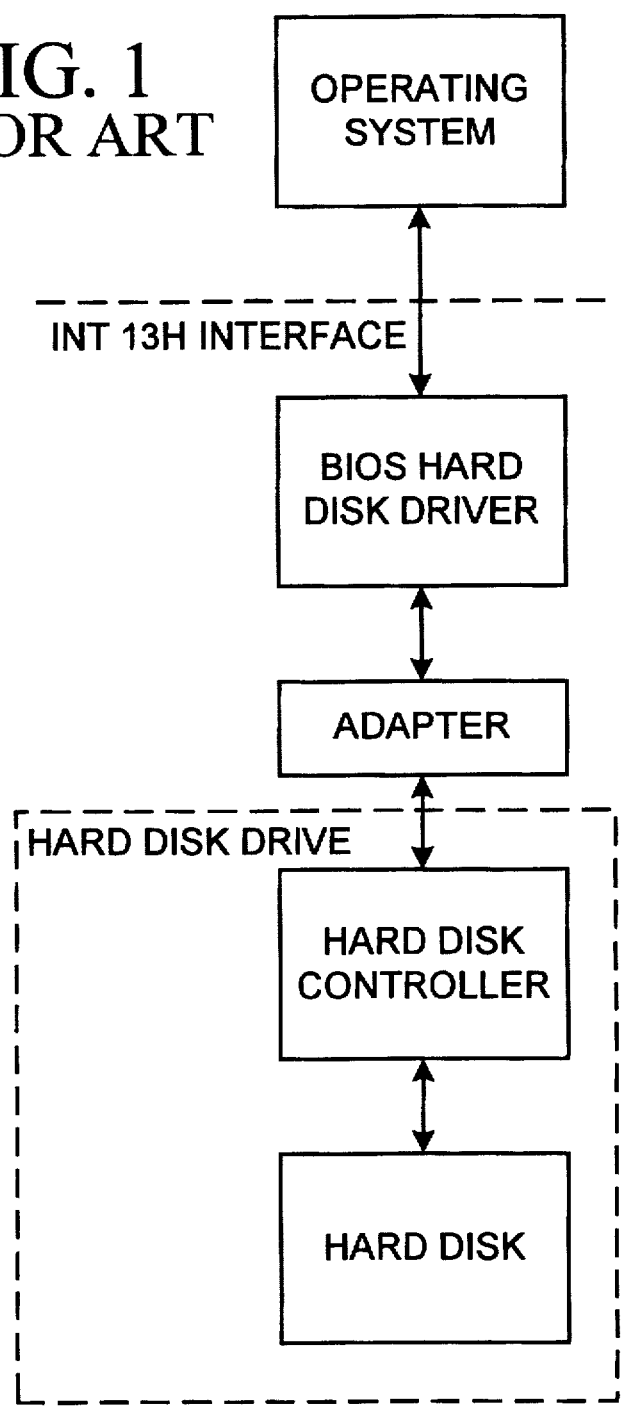
FIG. 1 is a block diagram of an operating system interacting with a hard disk drive using a BIOS hard disk driver according to the prior art.
Figure 2:
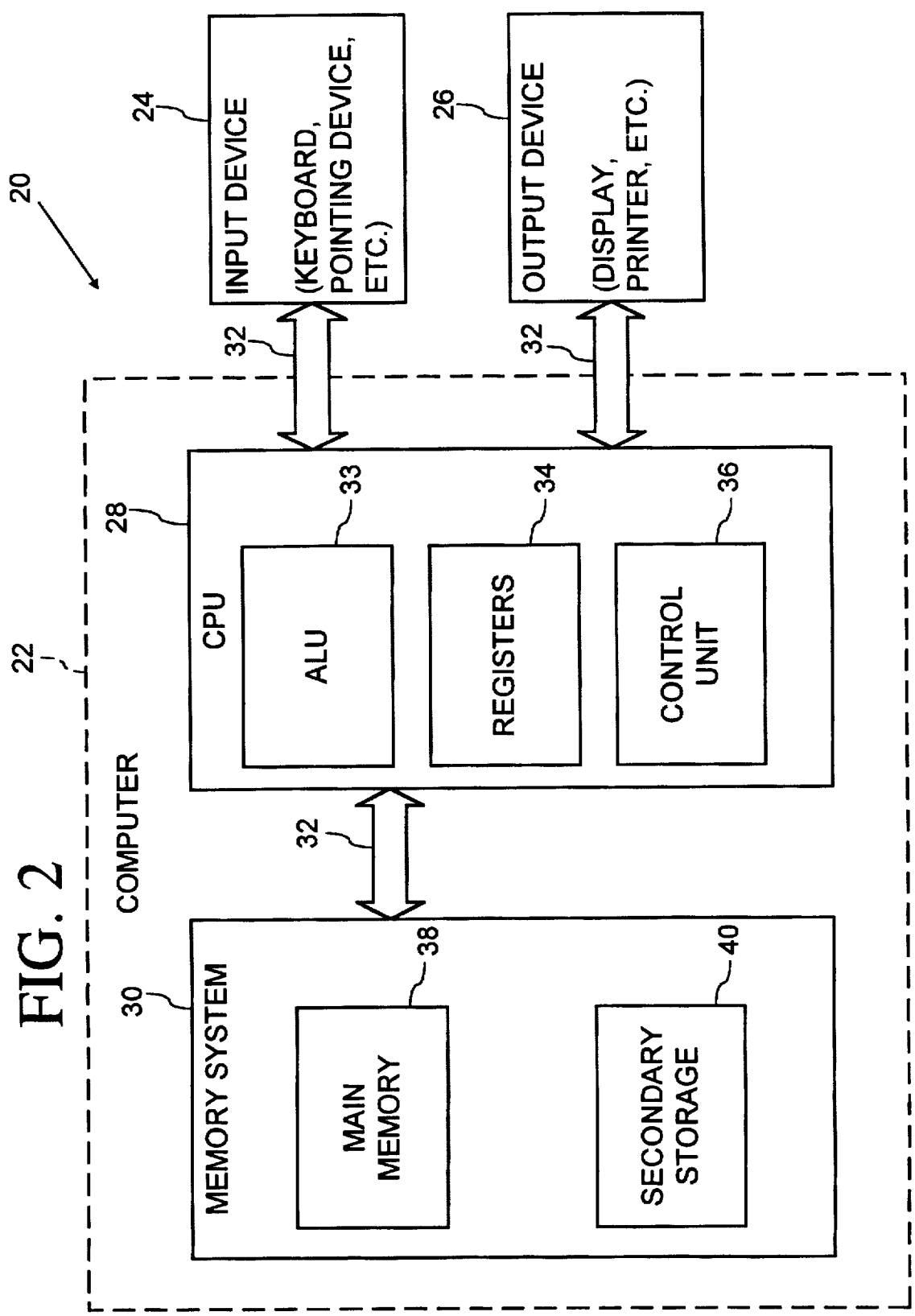
FIG. 2 is a block diagram of a computer system that may be used to implement a method and apparatus embodying the invention for data transfer mode verification of a protected mode hard disk driver.

FIG. 2 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system. In the preferred embodiment of the invention, CPU 28 is a microprocessor having a protected mode and a real mode of operation, such as the Intel protected mode microprocessors.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system, basic input/output system (BIOS), and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 2 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 3:
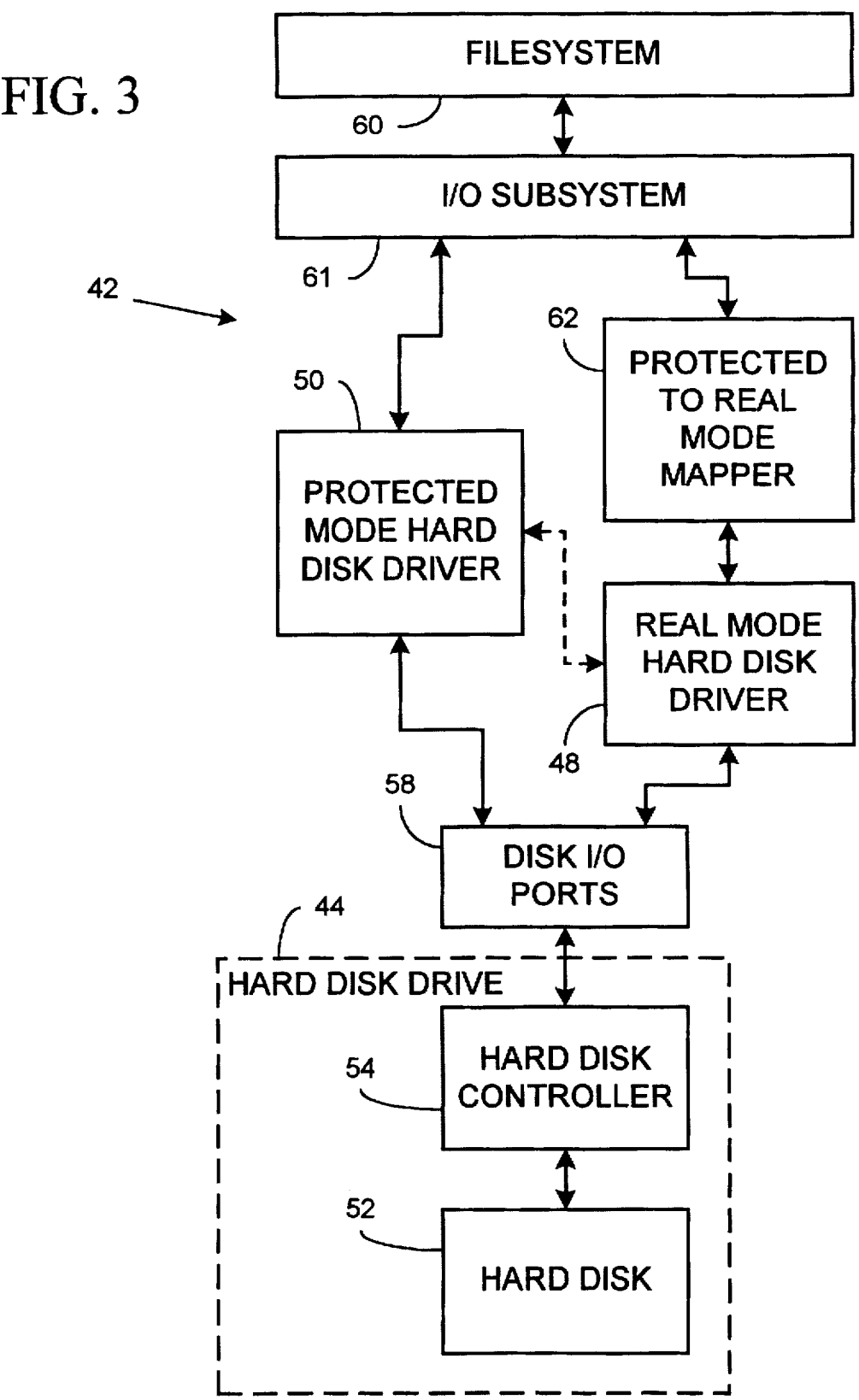
FIG. 3 is a block diagram of a portion of an operating system within a computer system such as shown in FIG. 2, including a file system and an input/output subsystem which interact with a hard disk drive through a protected mode hard disk driver according to a preferred embodiment of the invention.

FIG. 3 is a block diagram of a portion of an operating system 42 in communication with a hard disk drive 44 through a real mode hard disk driver 48 (such as the BIOS hard disk driver stored in the computer ROM) and/or a protected mode hard disk driver 50. Generally, hard disk drive 44 forms a part of the secondary storage 40 of computer system 20 in FIG. 2. In the preferred embodiment, hard disk drive 44 is a conventional hard disk drive for computers conforming to the Advanced Technology Attachment ("ATA") specification, and comprises a hard disk 52 and a hard disk controller 54. Hard disk 52 preferably consists of one or more disk shaped plates coated with a ferromagnetic material on which data can be electromagnetically recorded by one or more read/write heads. Hard disk controller 54 is an electronic circuit which controls recording and retrieval of data on hard disk 52. Hard disk drive 44 preferably is attached to computer bus 32 with an adapter. Hard disk controller 54 also provides a number of input/output ports 58 which are addressable by CPU 28 through computer bus 32 for the drivers 48, 50 to exchange data with hard disk controller 54.

Within the illustrated portion of the operating system 42 are a file system 60, an input/output subsystem 61, and a protected to real mode mapper 62. Each of the blocks 48, 50, and 60–62 in FIG. 3 is typically implemented as a module of code for a set of related functions which are executable on CPU 28. The functions of file system 60 are accessible to application programs via function calls provided in an application programming interface ("API") of the operating system. These functions access data on various hardware devices including the hard disk drive 44 in the form of an abstract data type generally referred to as a file. File system 60 may, for example, include functions for opening a file, closing a file, reading or writing a next byte or word of a file, and etc. Various conventionally known file systems may suitably be used as file system 60, including the file access table (FAT) file system used in Microsoft Corporation's DOS and Windows operating systems among others.

Input/output subsystem 61 is a module which forms an intermediate layer of the operating system between file system 60 and drivers for various data storage devices, such as hard disk drivers 48, 50. Input/output subsystem 61 provides services for routing file system requests to access data to a particular data storage device on which the data is stored. For example, input/output subsystem 61 routes requests to access data stored on the hard disk drive 44 through a hard disk driver 48 or 50 associated with the drive. Input/output subsystem 61 also may provide services for notifying the file system of device availability (e.g., device time-out), among others.

Protected to real mode mapper 62 is a module which enables the operating system to use existing real mode hard disk driver 48, by mapping data access requests of the input/output subsystem 61 to an interface of real mode hard disk driver 48. In the preferred embodiment, for example, requests of the input/output subsystem 61 to access data on hard disk 52 are mapped by protected to real mode mapper 62 to a corresponding function of the INT 13h interface of the existing BIOS hard disk driver 48. In this way, real mode hard disk driver 48 (through protected to real mode mapper 62) and protected mode hard disk driver 50 present a similar interface to input/output subsystem 61.

In the preferred embodiment, protected mode hard disk driver 50 is a module consisting of 32-bit code executable in the protected mode of CPU 28 (FIG. 2). Real mode hard disk driver 48 generally is a BIOS or like hard disk driver which consists of code executable in the real mode of CPU 28 for interacting with hard disk drive 44. Due to its use of 32-bit protected mode code, protected mode hard disk driver 48 in the preferred embodiment generally performs data transfers with hard disk drive 44 faster than real mode hard disk driver 48. Accordingly, during its start-up, operating system 42 preferably loads and substitutes protected mode hard disk driver 50 for real mode hard disk driver 48, and thereafter interacts with hard disk drive 44 through protected mode hard disk driver 50 to yield better hard disk drive performance.

Figure 4A:
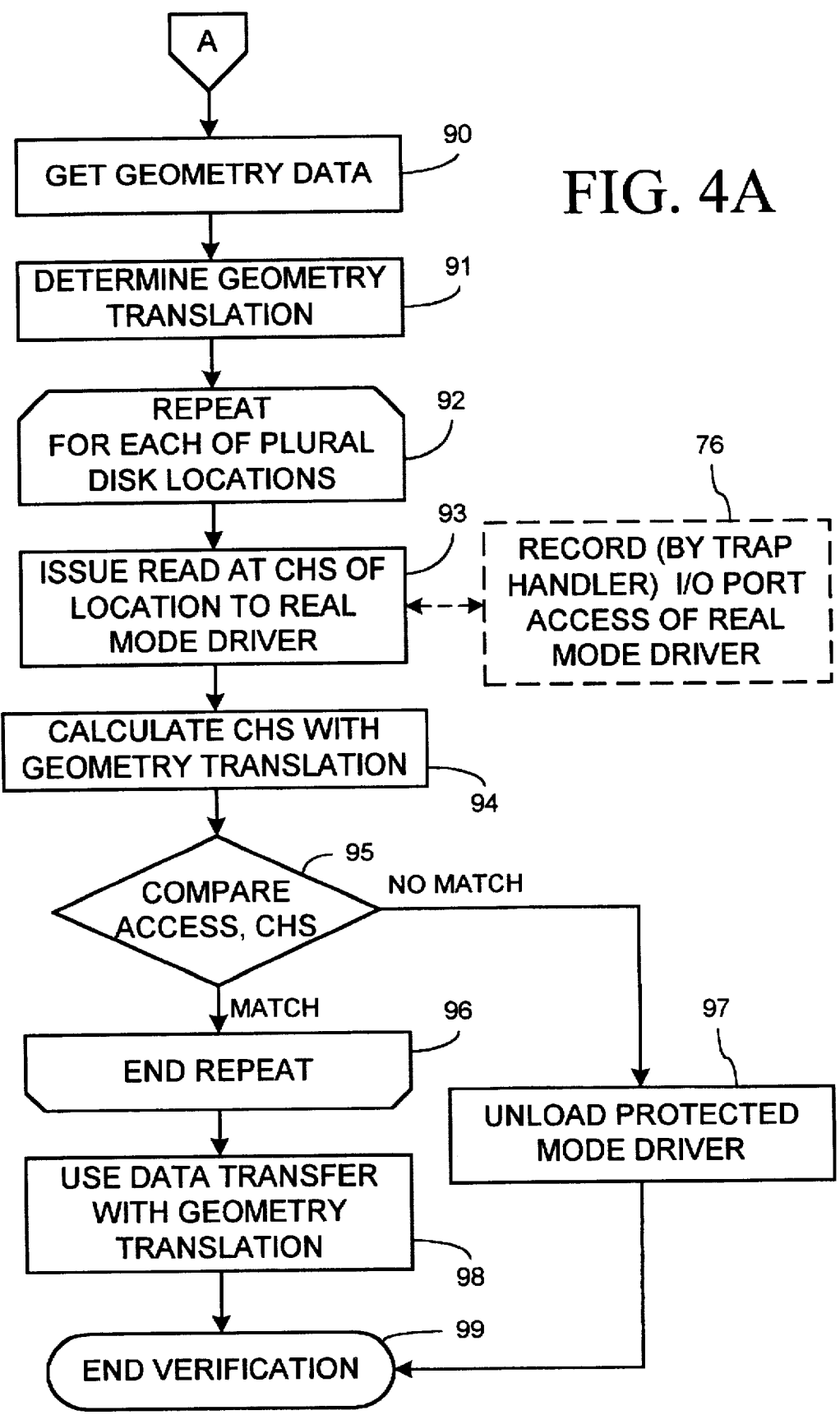

With reference to FIGS. 4 and 4A, protected mode hard disk driver 50 (FIG. 3) performs a verification method 70 according to a preferred embodiment of the invention to determine which transfer modes are available for use with hard disk drive 44 (FIG. 3) before being substituted for real mode hard disk driver 48 (FIG. 3). To determine the availability of a transfer mode, protected mode hard disk driver 50 tests which transfer mode is utilized by real mode hard disk driver 48. A transfer mode which is utilized by real mode hard disk driver 48 also reliably can be used by protected mode hard disk driver 50. Accordingly, by first performing method 70 to verify a transfer mode's availability before making use of the transfer mode, protected mode hard disk driver 50 can ensure that corruption of data on hard disk 52 (FIG. 3) does not result from its substitution for real mode hard disk driver 48. Verification method 70 preferably is performed during loading or initialization of protected mode hard disk driver 50, such as in an initialization routine of protected mode hard disk driver 50.

In method 70, protected mode hard disk driver 50 monitors signals (e.g. control and address data) exchanged between real mode hard disk driver 48 and hard disk controller 54 for a plurality of test data transfers to determine whether particular transfer modes are being utilized by real mode hard disk driver 48. Real mode hard disk driver 48 and hard disk controller 54 exchange signals for the test data transfers by writing data to input/output ports 58. Protected mode hard disk driver 50 monitors these signals by trapping any instructions executed by CPU 28 which address input/output ports 58 (FIG. 3).

As shown at an initial step 72 of method 70, protected mode hard disk driver 50 installs one of its functions as a trap handler to trap instructions which address input/output ports 58. The trap handler can be installed, for example, by setting a breakpoint at an address of input/output ports 58, and setting a interrupt vector for the breakpoint to point to the trap handler. After the trap handler is installed, CPU 28 (FIG. 2) transfers execution to the trap handler whenever an instruction of real mode hard disk driver 48 addresses input/output ports 58. In its trap handler function, protected mode hard disk driver 50 preferably includes code which monitors the real mode hard disk driver's access to input/output ports 58, such as by recording data written to the ports by the real mode hard disk driver as shown at steps 74 and 76.

Verification method 70 next comprises a loop of steps 80–87 in which real mode hard disk driver 48 is requested to read data from hard disk drive 44. Also in loop 80–87, any accesses by real mode hard disk driver 48 to input/output ports 58 are examined to determine the transfer mode used by real mode hard disk driver 48. To more accurately determine the transfer mode of real mode hard disk driver 48, loop 80–87 preferably is repeated for each of a plurality of different addresses which are widely dispersed across hard disk 52. In loop 80–87, protected mode hard disk driver 50 verifies whether real mode hard disk driver 48 performs data transfers without geometry translation. Within loop 80–87, protected mode hard disk driver 50 also examines the real mode hard disk driver's input/output port accesses to verify whether performance enhancing LBA or 32-bit PIO transfer modes are used. Verification method 70 further comprises steps 90–98 (FIG. 4A) including a second loop 92–96 in which real mode hard disk driver 48 again is requested to read data from widely dispersed addresses on hard disk 44, and its accesses to input/output ports 58 examined. In this second loop 92–96, protected mode hard disk driver 50 assumes that a geometry translation based on geometry data obtained from hard disk drive 44 with an identify command is utilized by real mode hard disk driver 48. Accordingly, protected mode hard disk driver verifies whether real mode hard disk driver 48 performs data transfers utilizing the assumed geometry translation.

More specifically, at step 81 in each iteration of the loop 80–87, protected mode hard disk driver 50 issues a request for real mode hard disk driver 48 to read data at one of the hard disk addresses. In the preferred embodiment of the invention, the request is issued by calling a "read disk sectors" function (e.g. function number 2) of the real mode hard disk driver 48 through the INT 13h interface as shown by the assembly language instructions for 80×86 microprocessors in the following Table 1.

TABLE 1

Assembly Language Instructions for Calling
Read Disk Sectors Function of BIOS Hard Disk Driver.

| Instruction | Operand(s) |
|---|---|
| MOV | AH, 02h |
| INT | 13h |

When calling this function, protected mode hard disk driver 50 passes parameters specifying the hard disk address which real mode hard disk driver 48 is to read by storing values into registers 34 (FIG. 2) of CPU 28 as shown in the following Table 2 before issuing the INT 13h instruction shown in Table 1.

TABLE 2

Parameters of BIOS Read Disk Sectors Function.

| Register | Parameter Data |
|---|---|
| AH | function number (i.e. 02h) of read disk sectors function |
| AL | number of sectors to read |
| CH | bits 0–7 of cylinder number |
| CL, bits 6–7 | bits 8–9 of cylinder number |
| CL, bits 0–5 | starting sector number |
| DH | head number |
| DL | drive number (80h or 81h) |
| es:bx | pointer to read buffer in memory 38 (FIG. 2) |

As shown in the above Table 2, the hard disk address is specified in these parameters by three values: a cylinder number, a head number, and a sector number (hereafter cylinder, head and sector address). In the preferred embodiment of the invention, protected mode hard disk driver 50 obtains the cylinder, head, and sector address by converting from a logical block address used by the operating system according to an apparent geometry of hard disk drive 52.

When called by the INT 13h instruction in protected mode hard disk driver 50 shown in Table 1, real mode hard disk driver 48 accesses input/output ports 58 to effect the requested read data transfer. Real mode hard disk driver 48 first writes data to certain of input/output ports 58 instructing hard disk controller 54 (FIG. 3) to read data at an address of hard disk 52. Generally, real mode hard disk driver 48 writes an address for the requested read data transfer in the form of a cylinder number, a head number, and a sector number (i.e. using cylinder, head, sector addressing) to input/output ports 58 as shown in the following Table 3.

TABLE 3

Input/output Port Accesses for Cylinder, Head, Sector Addressing.

| Input/Output Port | Address Data |
|---|---|
| 1F3h | Starting sector number |
| 1F4h | Cylinder number low byte |
| 1F5h | Cylinder number high byte |
| 1F6h | Drive and Head numbers |

In cases where real mode hard disk driver 48 utilizes geometry translation, the cylinder, head, and sector numbers specified in the INT 13h read request (as shown in Table 2) are first converted by real mode hard disk driver 48 to cylinder, head and sector numbers according to the actual geometry of hard disk 52 before being written to input/output ports 58 (as shown in Table 3). Accordingly, if real mode hard disk driver 48 utilizes geometry translation, the cylinder, head, and sector numbers of the INT 13h read request will not be the same as the cylinder, head and sector number written to input/output ports 58 for all hard disk addresses. However, if real mode hard disk driver 48 does not utilize geometry translation, the cylinder, head and sector numbers of the INT 13h read request are the same as those written to input/output ports 58 for all hard disk addresses.

On the other hand, in cases where real mode hard disk driver 48 utilizes the LBA data transfer mode, real mode hard disk driver 48 first converts the cylinder, head, and sector address of the INT 13h read request to a 24-bit logical starting sector number (hereafter LBA address) before writing the address to input/output ports 58. This conversion is performed, for example, as shown by the following equation:

$$A_{LB} = ((c_1 \cdot H_{T1}) + h_1) S_{T1} + s_1 - 1 \qquad (1)$$

where $A_{LB}$ is the 24-bit logical block address; $c_1$, $h_1$, and $s_1$ are the cylinder, head, and sector numbers of the INT 13h read request, respectively; $H_{T1}$ is the total number of heads in the apparent disk geometry; and $S_{T1}$ is the total number of sectors per track in the apparent disk geometry. Real mode hard disk driver 48 then writes the address for the requested read data transfer to input/output ports 58 in the form of the 24-bit logical block address as shown in the following Table 4.

TABLE 4

Input/output Port Accesses for Logical Block Addressing.

| Input/Output Port | Address Data |
|---|---|
| 1F3h | LBA low byte |
| 1F4h | LBA middle byte |
| 1F5h | LBA high byte |

Real mode hard disk driver 48 further writes a "head" value which contains a set of bits that indicate the LBA transfer mode is being utilized to port 1F6h.

Responsive to the data written to input/output ports 58 by real mode hard disk driver 48, hard disk controller 54 (FIG. 3) retrieves data from hard disk 52 into the controller's internal sector buffer (not shown) and signals real mode hard disk driver 48 (such as by an interrupt) that the hard disk data is available to be input through input/output ports 58. On receiving the hard disk controller's signal, real mode hard disk driver 48 inputs the hard disk data from input/output ports 58. Real mode hard disk driver 48 generally employs a software loop which includes an "input from port to string" instruction to input the hard disk data from port 1F0h of input/output ports 58. More specifically, in cases where real mode hard disk driver 48 does not utilize the 32-bit PIO data transfer mode, real mode hard disk driver 48 employs a software loop with a 16-bit input from port to string instruction (i.e. the "INSW" instruction of the Intel protected mode microprocessors). To input an entire sector having 512 bytes of data from hard disk 52, real mode hard disk driver 48 repeats this loop 256 times. In cases where real mode hard disk driver 48 utilizes the 32-bit PIO data transfer mode, however, real mode hard disk driver 48 employs a software loop with a 32-bit input from port to string instruction (i.e.

the "INSD" instruction of the Intel protected mode microprocessors). Since this instruction inputs 32-bits of data at a time, real mode hard disk driver 48 repeats the software loop only half as many times (i.e. 128 times) for each sector being read.

Each of the above described accesses to input/output ports 58 by real mode hard disk driver 48 cause CPU 28 to trap (i.e. transfer execution) to the trap handler installed by protected mode hard disk driver 50. As shown at step 74, the trap handler of protected mode hard disk driver 50 records each such access. At the completion of the requested read data transfer, real mode hard disk driver 48 returns execution to protected mode hard disk driver 50 with an interrupt return.

At steps 82, 84, and 86, protected mode hard disk driver 50 examines the input/output port accesses recorded by the trap handler to verify whether various data transfer modes are utilized by real mode hard disk driver 48. At step 82, protected mode hard disk driver 50 examines the recorded input/output port accesses to verify whether real mode hard disk driver 48 utilizes the 32-bit PIO data transfer mode. As described above, in cases where real mode hard disk driver 48 utilizes the 32-bit PIO data transfer mode, real mode hard disk driver inputs hard disk data from port 1F0h with the 32-bit INSD instruction rather than the 16-bit INSW instruction. Accordingly, protected mode hard disk driver 50 can determine whether real mode hard disk driver 48 utilizes the 32-bit PIO data transfer mode by checking whether the INSD or INSW instructions are used by real mode hard disk driver 48 in the trapped accesses to port 1F0h. If the INSD instruction is used in the trapped accesses to this port, then real mode hard disk driver 48 utilizes the 32-bit PIO data transfer mode. As indicated at step 83, if protected mode hard disk driver 50 determines that real mode hard disk driver 48 utilizes the 32-bit PIO data transfer mode, protected mode hard disk driver 50 then sets a flag to indicate that the 32-bit PIO data transfer mode also is available for its use when it substitutes for real mode hard disk driver 48.

At step 84, protected mode hard disk driver 50 examines the recorded input/output port accesses to verify whether real mode hard disk driver 48 utilizes the LBA data transfer mode. As described above, in cases where real mode hard disk driver 48 utilizes the LBA data transfer mode, a head value is written to port 1F6h. Also, a 24-bit LBA address is written to ports 1F3–1F5h rather than a cylinder, head and sector address. Accordingly, protected mode hard disk driver 50 can determine whether real mode hard disk driver 48 utilizes the LBA data transfer mode by checking the bits of the head value written to 1F6h. Protected mode hard disk driver 50 further verifies use of the LBA transfer mode by comparing the LBA address corresponding to the cylinder, head, and sector address of its INT 13h read request against data written by real mode hard disk driver 48 in accesses to ports 1F3–1F5h. Protected mode real mode driver 50 can determine the corresponding LBA address by applying equation (1) above to the cylinder, head and sector address of its INT 13h read request. The apparent hard disk geometry utilized in equation (1) can be obtained by issuing a request to real mode hard disk driver 48. If the bits of the head value are indicative of the LBA transfer mode and data written by real mode hard disk driver 48 in accesses to ports 1F3–1F5h matches the LBA address, then real mode hard disk driver 48 is utilizing the LBA data transfer mode. Accordingly, as indicated at step 85, protected mode hard disk driver 50 also uses the LBA data transfer mode when substituted for real mode hard disk driver 48, and verification method 70 ends at step 89. Otherwise, if the port access does not have a head value indicative of the LBA transfer mode or does not match the LBA address, verification method 70 proceeds to step 86.

At step 86, protected mode hard disk driver 50 further examines the recorded input/output port accesses to verify whether real mode hard disk driver 48 utilizes a data transfer mode with no geometry translation. To verify that no geometry translation occurs, protected mode hard disk driver 50 compares the data written by real mode hard disk driver 48 to ports 1F3–1F6h against the cylinder, head and sector address of its INT 13h read request. As described above, the cylinder, head, and sector addresses of the INT 13h read request and those of the port access will match for all addresses only if no geometry translation occurs. Accordingly, protected mode hard disk driver 50 determines that real mode hard disk driver 48 does not utilize geometry translation only if both of these cylinder, head, and sector addresses match in all iterations of the loop 80–87. If the cylinder, head, and sector addresses are found to match for all iterations of the loop 80–87, protected mode hard disk driver 50 also utilizes data transfers with no geometry translation when substituted for real mode hard disk driver 48 as indicated at step 88, and verification method 70 ends at step 89. Otherwise, if the addresses are found not to match in any iteration of loop 80–87 which indicates that some form of geometry translation is utilized by real mode hard disk driver 48, protected mode hard disk driver 50 proceeds to steps 90–98 (FIG. 4A).

Referring now to FIG. 4A, in steps 90–98 of verification method 70, protected mode hard disk driver 50 also verifies whether the geometry translation utilized by real mode hard disk driver 48 is the same as a geometry translation (the "assumed geometry translation") assumed to be utilized by real mode hard disk driver 48. Protected mode hard disk driver 50 determines the assumed geometry translation based on geometry data obtained from hard disk 44 with an identify command. In step 90, protected mode hard disk driver 50 issues the identify command directly to hard disk controller 54. In the preferred embodiment, the identify command is issued by writing command ECh to port 1F7h of input/output ports 58. In response to the identify command, hard disk controller 54 retrieves drive information from hard disk 52 including the geometry data which specifies the total number of cylinders, heads, and sectors on hard disk 52. Protected mode hard disk driver 50 inputs this drive information from hard disk controller 54 through port 1F0h.

At step 91, protected mode hard disk driver 50 determines the assumed geometry translation for mapping cylinder, head and sector addresses from the apparent hard disk geometry (i.e. cylinder, head and sector address in an INT 13h read request) to the hard disk's actual geometry as specified by the geometry data (i.e. cylinder, head and sector address written to input/output ports 58). In the preferred embodiment, the assumed geometry translation maps from the apparent to actual disk geometry by first converting a cylinder, head and sector address of a INT 13h read request to a logical block address as shown in equation (1) above. The logical block address is then converted to a cylinder, head and sector address for the actual hard disk geometry as shown in the following equations (2)–(4).

$$c_2 = \frac{A_{LB} + 1}{H_{T2}S_{T2}} \quad (2)$$

$$h_2 = \frac{A_{LB} - c_2 H_{T2} S_{T2} + 1}{S_{T2}} \quad (3)$$

-continued $$s_2 = A_{LB} - c_2 H_{T2} S_{T2} - h_2 S_{T2} + 1 \quad (4)$$

where $c_2$, $h_2$ and $s_2$ are the cylinder, head, and sector numbers of the translated address; $c_2$ and $h_2$ are rounded to the next lower integer; $A_{LB}$ is the logical block address; and $S_{T2}$ and $H_{T2}$ are the total number of sectors per track and the total number of heads, respectively, in the geometry data obtained with the identify command in step 90.

Steps 92–96 form a second loop in which protected mode hard disk driver 50 verifies if the assumed geometry translation actually is utilized by real mode hard disk driver 48. At step 92 in each iteration of this loop, protected mode hard disk driver 50 again issues INT 13h read requests to real mode hard disk driver 48 for one of a plurality of dispersed addresses of hard disk 52. The same addresses may be used in second loop 92–96 as are used in first loop 80–87 (FIG. 4). As indicated at step 76, the trap handler installed by protected mode hard disk driver 50 in step 72 again traps and records the real mode hard disk driver's accesses to input/output ports 58.

Protected mode hard disk driver 50 then examines the input/output port accesses to determine if real mode hard disk driver 48 utilizes the assumed geometry translation. At step 94, protected mode hard disk driver 50 converts the cylinder, head and sector address specified in the parameters of the INT 13h read request according to the assumed geometry translation described above to a translated cylinder, head and sector address.

At step 95, protected mode hard disk driver 50 compares the translated cylinder, head and sector address against the data written by real mode hard disk driver 48 in its access to ports 1F3–1F6h. In cases where real mode hard disk driver 48 utilizes the assumed geometry translation, the translated cylinder, head and sector addresses calculated by protected mode hard disk driver 50 will match the cylinder, head and sector addresses written by real mode hard disk driver 48 in the port 1F3–1F6h accesses in all iterations of loop 92–96. Accordingly, if these cylinder, head and sector addresses do not match in any iteration of loop 92–96, real mode hard disk driver 48 does not utilize the assumed geometry translation. Since protected mode hard disk driver 50 at this point has failed to verify that any of the LBA data transfer mode, data transfers with no geometry translation, or data transfers with the assumed geometry translation are utilized by real mode hard disk driver 48, protected mode hard disk driver 50 cannot substitute for real mode hard disk driver 48 without risking probable corruption of data on hard disk 52. Protected mode hard disk driver 50 thus unloads at step 97, and is not substituted for real mode hard disk driver 48.

If, on the other hand, protected mode hard disk driver's translated cylinder, head and sector addresses match those in real mode hard disk driver's port accesses in all iterations of loop 92–96, protected mode hard disk driver 50 has verified that the assumed geometry translation is utilized by real mode hard disk driver 48. Protected mode hard disk driver 50 thus also utilizes the assumed geometry translation when substituted for real mode hard disk driver 48 as indicated at step 98, and ends verification method 70 at step 99.

Having described and illustrated the principles of my invention with reference to a preferred embodiment, it will be recognized that the preferred embodiment can be modified in arrangement and detail without departing from such principles. For example, elements of the preferred embodiment shown in software may be implemented in hardware and vice versa. In view of the many possible embodiments to which the principles of my invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A computer system, comprising:
   a processor for running one or more programs including an operating system program, the processor having a real mode of operation and a protected mode of operation;
   a data storage device having a recordable medium for storing data;
   a data storage device controller for controlling storage of data on the recordable medium;
   one or more input/output ports coupling the processor and the data storage device controller;
   a real mode dryer executing on the processor for transferring data in the real mode of operation of the processor between the programs and the data storage device controller via the input/output ports; and
   a protected mode dryer executing on the processor and being operative to analyze accesses to the input/output ports by the real mode driver for a plurality of test data transfers so as to verify whether a geometry translation is utilized by the real mode driver, the protected mode driver being operative in place of the real mode driver to transfer data in the protected mode of operation of the processor between the programs and the data storage device controller utilizing the geometry translation if the protected mode driver verifies that the geometry translation also is utilized by the real mode driver.

2. The computer system of claim 1 wherein the protected mode driver is operative to retrieve geometry data from the data storage device controller, and to verify whether a geometry translation based on the retrieved geometry data is utilized by the real mode driver, the protected mode driver being operative to transfer data in the protected mode of operation of the processor between the programs and the data storage device controller utilizing the geometry translation based on the retrieved geometry data if the protected mode driver verifies that the geometry translation based on the retrieved data is utilized by the real mode driver.

3. The computer system of claim 2 wherein the protected mode driver is operative to issue read requests to the real mode driver specifying a plurality of data storage device addresses, to trap accesses to the input/output ports by the real mode driver, to record data storage device addresses specified in the trapped input/output port accesses, to convert the data storage device addresses specified in the read requests utilizing the geometry translation based on the retrieved geometry data, and to compare the converted data storage device addresses with the data storage device addresses specified in the input/output port accesses to thereby verify when the converted data storage device addresses match the data storage device addresses specified in the input/output port accesses that the real mode driver utilizes the geometry translation based on the retrieved geometry data.

4. The computer system of claim 1 wherein the protected mode driver is operative to verify whether logical block addressing is utilized by the real mode driver, the protected mode driver being operative to transfer data in the protected mode of operation of the processor between the programs and the data storage device controller using logical block addressing if logical block addressing is utilized by the real mode driver.

5. The computer system of claim 4 wherein the protected mode driver is operative to disable logical block addressing in data transfers by the protected mode driver if the protected mode driver verifies that logical block addressing is not utilized by the real mode driver.

6. The computer system of claim 4 wherein the protected mode driver is operative to trap an input/output port access of the real mode driver, and to determine if the input/output port access specifies a data storage device address using logical block addressing to thereby verify whether logical block addressing is utilized by the real mode driver.

7. The computer system of claim 1 wherein the protected mode driver is operative to verify whether a 32-bit programmed input/output data transfer mode is utilized by the real mode driver, the protected mode driver being operative to transfer data in the protected mode of operation of the processor between the programs and the data storage device controller using the 32-bit programmed input/output data transfer mode if the 32-bit programmed input/output data transfer mode is utilized by the real mode driver.

8. The computer system of claim 7 wherein the protected mode driver is operative to disable the 32-bit programmed input/output data transfer mode in data transfers by the protected mode driver if the protected mode driver verifies that the 32-bit programmed input/output data transfer mode is not-utilized by the real mode driver.

9. The computer system of claim 7 wherein the protected mode driver is operative to trap an input/output port access of the real mode driver, and to determine if the input/output port access transfers data in the 32-bit programmed input/output data transfer mode to thereby verify whether the 32-bit programmed input/output data transfer mode is utilized by the real mode driver.

10. An operating system for a computer having a hard disk drive, a disk port coupled to the hard disk drive, and a real mode driver in communication with the hard disk drive through the disk port, the operating system comprising:

a protected mode disk port driver having code for bypassing the real mode driver to perform data transfers directly with the hard disk drive utilizing a transfer mode;

a transfer mode verifier comprising code for verifying whether the real mode driver utilizes the transfer mode in performing data transfers with the hard disk drive; and a driver initializer in communication with the transfer mode verifier and protected mode disk port driver, the driver initializer having code for enabling the protected mode disk port driver to bypass the real mode driver to perform data transfer directly with the hard disk drive utilizing the transfer mode if the transfer mode verifier verifies that the real mode driver utilizes the transfer mode in performing data transfers with the hard disk drive.

11. The operating system of claim 10 wherein the transfer mode verifier comprises:

a real mode driver tester in communication with the real mode driver and having code for issuing read requests for the real mode driver to read data from the hard disk driver at a plurality of hard disk addresses;

a trap handler having code for intercepting data written to the disk port by the real mode driver responsive to the read requests; and a comparator in communication with the trap handler and protected mode disk port driver and having code for evaluating the intercepted data to thereby verify whether the real mode driver utilizes the transfer mode in performing data transfers with the hard disk drive.

12. The operating system of claim 11 wherein the protected mode disk port driver comprises:

a disk geometry reader having code for issuing an identify command to the hard disk drive, and for reading geometry data from the hard disk drive; and a translator having code for translating storage addresses of data transfers by the protected mode disk port driver according to the geometry data;

the comparator having code for comparing the translated storage addresses to addresses specified in the intercepted data to thereby verify when the translated storage addresses match the addresses specified in the intercepted data that the real mode driver utilizes a geometry translation based on the geometry data.

13. The operating system of claim 11 wherein the transfer mode of the protected mode disk port driver is a logical block addressing mode.

14. The operating system of claim 11 wherein the transfer mode of the protected mode disk port driver is a 32-bit programmed input output data transfer mode.

15. A method for a substitute data storage device driver in a computer system to determine the available access modes of a data storage device having a recordable data storage media, comprising:

issuing a plurality of read requests to an existing data storage device driver at a plurality of storage addresses dispersed across the recordable data storage media of the data storage device;

trapping accesses of the existing data storage device driver to the data storage device in response to the issued read requests;

recording data generated by the existing data storage device driver to perform the accesses;

generating data by the substitute data storage device driver to perform the accesses using an access mode;

comparing the data generated by the existing data storage device driver to the data generated by the substitute data storage device driver; and determining that the access mode is available to the substitute data storage device driver if the data generated by the existing data storage device driver matches the data generated by the substitute data storage device driver.

16. The method of claim 15 comprising:

if the access mode is available, performing data transfers using the access mode by the substitute data storage device driver directly accessing the data storage device and bypassing the existing data storage device driver.

17. A computer-readable storage medium having instructions contained thereon that are executable in a computer system for a substitute data storage device driver to determine the available access modes of a data storage device having a recordable data storage media, the computer-executable instructions comprising:

instructions for issuing a plurality of read requests to an existing data storage device dryer at a plurality of storage addresses dispersed across the recordable data storage media of the data storage device;

instructions for trapping accesses of the existing data storage device driver to the data storage device in response to the issued read requests:

instructions for recording data generated by the existing data storage device driver to perform the accesses;

instructions for generating data by the substitute data storage device driver to perform the accesses using an access mode;

instructions for comparing the data generated by the existing data storage device driver to the data generated by the substitute data storage device driver; and instructions for determining that the access mode is available to the substitute data storage device driver if the data generated by the existing data storage device driver matches the data generated by the substitute data storage device driver.

* * * * *

UNITED STATES PATENT AND TRADEMARK OFFICE
CERTIFICATE OF CORRECTION

PATENT NO. : 5,710,941
DATED : January 20, 1998
INVENTOR(S) : William G. Parry

It is certified that error appears in the above-identified patent and that said Letters Patent is hereby corrected as shown below:

| Col/Line | | Should Read |
|---|---|---|
| 1/60 | programs applications) | programs (e.g. applications) |

In the Claims:

| Col/Line | | Should Read |
|---|---|---|
| 14/13 | dryer | driver |
| 14/17 | dryer | driver |
| 15/17 | not-utilized | not utilized |
| 16/47 | dryer | driver |
| 16/52 | requests: | requests; |

Signed and Sealed this

Fifth Day of January, 1999

Attest:

Attesting Officer

Acting Commissioner of Patents and Trademarks